(12) United States Patent
Tanaka et al.

(10) Patent No.: US 11,787,129 B2
(45) Date of Patent: Oct. 17, 2023

(54) SURFACE-COATED FILM, SURFACE-COATED FIBER-REINFORCED RESIN MOLDED PRODUCT, AND MANUFACTURING METHOD THEREOF

(71) Applicant: Teijin Limited, Osaka (JP)

(72) Inventors: Yoshitaka Tanaka, Tokyo (JP); Koji Kubo, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 17/280,592

(22) PCT Filed: Sep. 27, 2019

(86) PCT No.: PCT/JP2019/038410
§ 371 (c)(1),
(2) Date: Mar. 26, 2021

(87) PCT Pub. No.: WO2020/067535
PCT Pub. Date: Apr. 2, 2020

(65) Prior Publication Data
US 2022/0032558 A1 Feb. 3, 2022

(30) Foreign Application Priority Data

Sep. 28, 2018 (JP) ................................ 2018-185565

(51) Int. Cl.
*B29C 70/02* (2006.01)
*B32B 5/12* (2006.01)
(Continued)

(52) U.S. Cl.
CPC .............. *B29C 70/026* (2013.01); *B32B 5/12* (2013.01); *B32B 7/12* (2013.01); *B32B 27/38* (2013.01); *B29K 2063/00* (2013.01); *B29K 2105/089* (2013.01); *B29K 2307/04* (2013.01); *B32B 2260/021* (2013.01); *B32B 2260/046* (2013.01); *B32B 2262/106* (2013.01); *B32B 2307/518* (2013.01); *B32B 2307/732* (2013.01)

(58) Field of Classification Search
None
See application file for complete search history.

(56) References Cited

U.S. PATENT DOCUMENTS 6,790,525 B2   9/2004   Takeuchi et al.
7,160,610 B2   1/2007   Takeuchi et al.
(Continued)

FOREIGN PATENT DOCUMENTS

AU    3011600 A    11/2000
JP    2001-009900 A    1/2001
(Continued)

OTHER PUBLICATIONS

Nov. 19, 2019—International Search Report—Intl App PCT/JP2019/038410.

*Primary Examiner* — Tamra L. Dicus
(74) *Attorney, Agent, or Firm* — Banner & Witcoff, Ltd.

(57) ABSTRACT

The present invention provides: a surface-coated film which is for being integrally formed with a fiber impregnation resin; a surface-coated fiber-reinforced resin molded product; and a manufacturing method thereof. The surface-coated film has a base film B and an easily adhesive layer A provided on the base film B, wherein the base film B has a flat layer b2 and an easily molded layer b1 adjacent to the easily adhesive layer A, the thickness of the easily adhesive layer A is 30-250 nm, the thickness of the base film B is 50-500 μm, the easily molded layer b1 and the flat layer b2 satisfy both expression 1 of 3≤ratio (EHb2/EHb1) of storage elastic modulus EHb2 of flat layer b2 at 150° C. to storage elastic modulus EHb1 of easily molded layer b1 at 150° C., and expression 2 of 1,000 MPa≤storage elastic modulus ELb1 of easily molded layer b1 at 23° C.

11 Claims, 1 Drawing Sheet

(51) Int. Cl.
*B32B 7/12* (2006.01)
*B32B 27/38* (2006.01)
*B29K 63/00* (2006.01)
*B29K 105/08* (2006.01)
*B29K 307/04* (2006.01)

(56) References Cited

U.S. PATENT DOCUMENTS

| | | |
|---|---|---|
| 2002/0059762 A1 | 5/2002 | Takeuchi et al. |
| 2005/0003170 A1 | 1/2005 | Takeuchi et al. |
| 2015/0129120 A1 | 5/2015 | Minomo et al. |
| 2016/0237319 A1 | 8/2016 | Takarada et al. |

FOREIGN PATENT DOCUMENTS

| | | | |
|---|---|---|---|
| JP | 2002-103524 A | | 4/2002 |
| JP | 2003-291269 A | | 10/2003 |
| JP | 2010265376 A | * | 11/2010 |
| JP | 4645334 B2 | | 3/2011 |
| JP | 5771061 B2 | | 8/2015 |
| JP | 2016-151580 A | | 8/2016 |
| JP | 2017-100391 A | | 6/2017 |
| JP | 2017100391 A | * | 6/2017 |
| JP | 2018-103425 A | | 7/2018 |
| JP | 2018167515 A | * | 11/2018 |
| WO | 2008-053756 A1 | | 5/2008 |
| WO | 2013-183489 A1 | | 12/2013 |

* cited by examiner

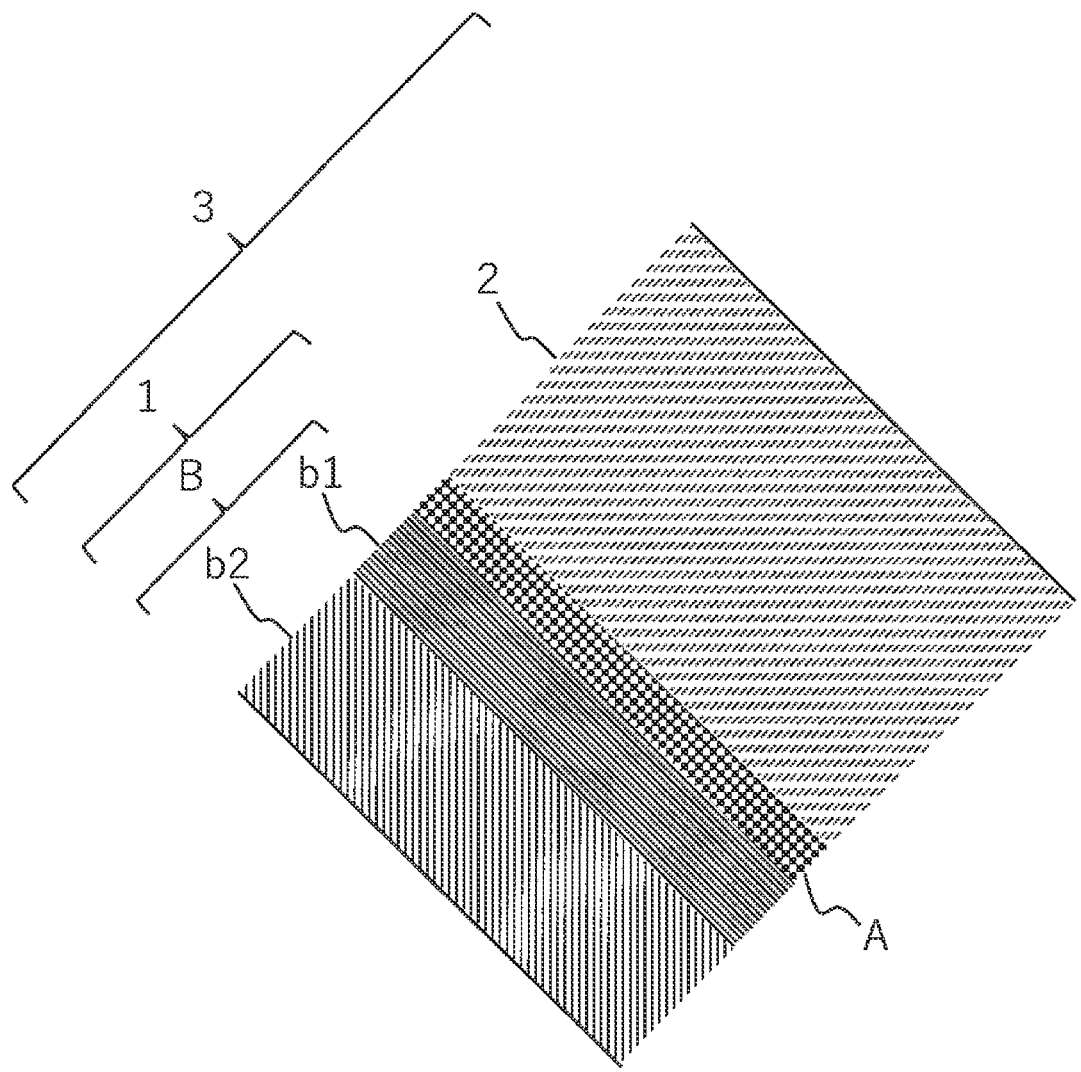

SURFACE-COATED FILM, SURFACE-COATED FIBER-REINFORCED RESIN MOLDED PRODUCT, AND MANUFACTURING METHOD THEREOF

CROSS REFERENCE TO RELATED APPLICATIONS

This application is a U.S. National Phase under 35 U.S.C. § 371 of International Application No. PCT/JP2019/038410, filed Sep. 27, 2019, which claims priority to Japanese Patent Application No. 2018-185565, filed Sep. 28, 2018, the entire contents of which is incorporated herein by reference.

TECHNICAL FIELD

The present invention relates to a surface coating film and a surface-coated fiber-reinforced resin molded article, and a method for producing the same.

BACKGROUND ART

In recent years, fiber reinforced resin molded articles have been widely proposed as a member of sporting goods, automobiles, ships, aircrafts, or the like that receive large impact or deformation stress, and are positively employed particularly in fields requiring light weight and high mechanical properties. For example, a carbon fiber reinforced resin molded article is produced by impregnating carbon fibers with a resin (hereinafter, also referred to as a "matrix resin") constituting a fiber impregnated resin such as a thermoplastic resin or a thermosetting resin and curing the resin as necessary. Since the carbon fiber reinforced resin molded article produced in this manner is reinforced with carbon fibers, the carbon fiber reinforced resin molded article has significantly improved physical properties and is a lightweight and tough member.

The above-described fiber reinforced resin molded article causes an unevenness on a surface of the fiber reinforced resin molded article, which reflects a texture or stitch of fabric, knitting, or the like, and it is difficult to obtain a smooth surface.

As a technique by which a fiber reinforced plastic member having a smooth surface can be obtained without impairing characteristics of the fiber reinforced plastic which is lightweight, for example, a fiber reinforced plastic member is disclosed, which includes the following constituent elements: [A] fiber reinforced plastic containing fabric or knitting of a reinforced fiber and a thermosetting resin; [B] a low elastic modulus surface layer having a tensile elastic modulus of 0.1 MPa to 500 MPa; and [C] a high elastic modulus surface layer having a tensile elastic modulus of 1000 MPa to 30000 MPa, in which the constituent element [C] is disposed via the constituent element [B] on at least one side of the constituent element [A] (see, for example, Patent Literature 1).

Further, as a method of efficiently obtaining a thermoplastic carbon fiber composite material in which adhesion is good, a carbon fiber pattern can be concealed, and which has improved design, for example, a method for producing a thermoplastic carbon fiber composite material having a film is disclosed, which includes: 1) a step of obtaining a molded article made of a thermoplastic carbon fiber composite material by using a mold whose surface temperature is 120° C. or higher and 180° C. or lower; and 2) a film forming step of forming a film on a surface of the obtained molded article, in which 1) the step of obtaining a molded article is hot press molding, and in 2) the film forming step, in-mold coating paint added with an initiator is injected into a mold and cured, the initiator having a half-life at 140° C. of one second or more and 2000 seconds or less (see, for example, Patent Literature 2).

CITATION LIST

Patent Literature

Patent Literature 1: Japanese Patent No. 4645334
Patent Literature 2: Japanese Patent No. 5771061

SUMMARY OF INVENTION

Technical Problem

In the fiber reinforced resin molded article described in Patent Literature 1, in order to conceal an uneven pattern such as a texture or stitch of fibers or color, it is necessary to perform painting repeatedly after undercoating. Further, since bubbles are easily mixed into the above-described uneven pattern and productivity is poor, there is a demand for further improvement of the method for producing a thermoplastic carbon fiber composite material described in Patent Literature 2.

The present invention has been made in view of the above, and an object of the present invention is to provide a surface coating film excellent in image clarity when integrally molded with a fiber impregnated resin and a surface-coated fiber-reinforced resin molded article obtained by integrally molding the surface coating film and a fiber impregnated resin, and a method of producing the same.

Another object of the present invention is to provide a surface coating film having excellent glossiness when integrally molded with a fiber impregnated resin and a surface-coated fiber-reinforced resin molded article obtained by integrally molding the surface coating film with a fiber impregnated resin, and a method of producing the same.

Solution to Problem

As a result of intensive studies to solve the above problem, the present inventors have found that a surface coating film has an excellent image clarity even when the surface coating film is integrally molded with a fiber impregnated resin, the surface coating film including a base material film B having a specific thickness and an easily adhesive layer A provided on the base material film B, the base material film B including an easily molded layer b1 adjacent to easily adhesive layer A and a flat layer b2, in which storage modulus of each of the easily molded layer b1 and the flat layer b2 satisfies a specific relationship, and the easily adhesive layer A has a specific thickness.

That is, solution to the problem includes the following embodiments. <1> A surface coating film for integral molding with a fiber impregnated resin, the film including: a base material film B; and an easily adhesive layer A provided on the base material film B, the base material film B including an easily molded layer b1 adjacent to the easily adhesive layer A and a flat layer b2, in which the easily adhesive layer A has a thickness of 30 nm to 250 nm, the base material film B has a thickness of 50 µm to 500 µm, and the easily molded layer b1 and the flat layer b2 satisfy each of the following formula 1 and formula 2.

$$3 \leq \text{ratio } (EHb2/EHb1) \text{ of storage modulus } EHb2 \text{ of the flat layer } b2 \text{ at } 150°\text{ C. to storage modulus } EHb1 \text{ of the easily molded layer } b1 \text{ at } 150°\text{ C.} \quad \text{Formula 1}$$

$$1000 \text{ MPa} \leq \text{storage modulus } ELb1 \text{ of the easily molded layer } b1 \text{ at } 23°\text{ C.} \quad \text{Formula 2}$$

<2> The surface coating film according to <1>, in which the EHb2/EHb1 in the formula 1 is 50 or less.
<3> The surface coating film according to <1> or <2>, in which the easily molded layer b1 further satisfies the following formula 3.

$$10 \text{ MPa} \leq \text{storage modulus } EHb1 \text{ of the easily molded layer } b1 \text{ at } 150°\text{ C.} \leq 950 \text{ MPa} \quad \text{Formula 3}$$

<4> The surface coating film according to any one of <1> to <3>, in which the base material film B is a biaxially oriented film.
<5> The surface coating film according to any one of <1> to <4>, in which the easily molded layer b1 and the flat layer b2 contain a thermoplastic resin.
<6> The surface coating film according to any one of <1> to <5>, in which the easily adhesive layer A contains:
a binder resin;
a crosslinking agent having at least one functional group selected from the group consisting of an epoxy group, an oxazoline group, a silanol group, and an isocyanate group; and a cured product of the binder resin and the crosslinking agent.
<7> The surface coating film according to any one of <1> to <6>, in which total light transmittance of visible light is 80% or more.
<8> A surface-coated fiber-reinforced resin molded article including the surface coating film according to any one of <1> to <7> and a fiber impregnated resin are integrally molded with the surface coating film.
<9> The surface-coated fiber-reinforced resin molded article according to <8>, in which the fiber impregnated resin contains carbon fibers.
<10> A method for producing a surface-coated fiber-reinforced resin molded article, including a process of: connecting the easily adhesive layer A of the surface coating film according to any one of <1> to <7> and a fiber impregnated resin; and integrally molding the surface coating film with the fiber impregnated resin.
<11> The method for producing a surface-coated fiber-reinforced resin molded article according to <10>, in which the process contains integrally molding the fiber impregnated resin at 150° C. for 10 minutes or less.

Advantageous Effects of Invention

According to an embodiment of the present invention, a surface coating film having excellent image clarity when integrally molded with a fiber impregnated resin and a surface-coated fiber-reinforced resin molded article obtained by integrally molding the surface coating film and a fiber impregnated resin, and a method of producing the same are provided.

According to another embodiment of the present invention, a surface coating film having excellent glossiness when integrally molded with a fiber impregnated resin and a surface-coated fiber-reinforced resin molded article obtained by integrally molding the surface coating film and a fiber impregnated resin, and a method of producing the same are provided.

BRIEF DESCRIPTION OF DRAWINGS

FIG. 1 is a schematic diagram of a configuration of a surface-coated fiber-reinforced resin molded article which is an embodiment of the present invention.

DESCRIPTION OF EMBODIMENTS

Hereinafter, contents of the present invention will be described in detail.

Description of constituent requirements to be described below may be made based on representative embodiments of the present invention, but the present invention is not limited to such embodiments.

In the present description, "to" indicating a numerical range is used in a sense including numerical values described before and after it as a lower limit value and an upper limit value.

In addition, in a description of a group (atom group) in the present description, a description not noting substituted or unsubstituted includes those having no substituent and those having a substituent. For example, an "alkyl group" includes not only an alkyl group having no substituent (unsubstituted alkyl group) but also an alkyl group having a substituent (substituted alkyl group).

In the present description, "(meth)acryl" is a term used in a concept containing both acryl and methacryl, and "(meth)acryloyl" is a term used as a concept containing both acryloyl and methacryloyl.

A term "step" in the present description includes not only an independent step, and but also a step which cannot be clearly distinguished from other steps if the intended purpose of the step is achieved.

In the present invention, "mass %" and "weight %" are synonymous, and "part by mass" and "part by weight" are synonymous.

Unless otherwise specified, each component in a composition or each constituent unit in a polymer may be contained alone or in combination of two or more in the present invention.

Further, in the present invention, the amount of each component in the composition or each constituent unit in the polymer means a total amount of a plurality of corresponding substances present in the composition or a plurality of corresponding constituent units present in the polymer unless otherwise specified when there are a plurality of substances or constituent units corresponding to each component in the composition or each constituent unit in the polymer.

In the present invention, a combination of two or more preferable embodiments is a more preferable embodiment.

In the present description, "image clarity" can be evaluated by visually observing a surface of the surface coating film under a fluorescent lamp and distortion of a reflected image of a fluorescent lamp projected on the surface of the surface coating film in an integrally molded article of the fiber impregnated resin and the surface coating film. The more clearly details of a contour, a shape, or the like of the reflected image of the fluorescent lamp are projected, the better the image clarity is.

In the present description, "glossiness" can be evaluated by measuring a 60° gloss value (hereinafter also referred to as "glossiness/60°") of the surface coating film surface in the integrally molded article of the fiber impregnated resin and the surface coating film. The higher the value of the glossiness/60°, the better the glossiness is.

Hereinafter, the surface coating film and a surface-coated fiber-reinforced resin molded article, and a method for producing the same according to the present invention will be described.

(Surface Coating Film)

A surface coating film for integrally molding with a fiber impregnated resin according to the present invention includes a base material film B, and an easily adhesive layer A provided on the base material film B, the base material film B including an easily molded layer b1 adjacent to the easily adhesive layer A and a flat layer b2, in which the easily adhesive layer A has a thickness of 30 nm to 250 nm, the base material film B has a thickness of 50 µm to 500 µm, and the easily molded layer b1 and the flat layer b2 satisfy each of the following formula 1 and formula 2.

$3 \leq$ ratio ($EHb2/EHb1$) of storage modulus $EHb2$ of the flat layer $b2$ at 150° C. to storage modulus $EHb1$ of the easily molded layer $b1$ at 150° C.  Formula 1

1000 MPa $\leq$ storage modulus $ELb1$ of the easily molded layer $b1$ at 23° C.  Formula 2

As a result of intensive studies by the present inventors, it has been found that a surface coating film having excellent image clarity when integrally molded with the fiber impregnated resin (hereinafter, also simply referred to as "image clarity") can be obtained by adopting the above configuration. Further, it has been found that when the surface-coated fiber-reinforced resin molded article is molded using the surface coating film and a fiber impregnated resin to be described later, it is possible to obtain the surface-coated fiber-reinforced resin molded article which can be integrally molded with good productivity and can obtain design and surface planarization even without painting or the like.

A detailed mechanism by which the above effect can be obtained is unclear, but is presumed as follows.

When the fiber impregnated resin is subjected to surface processing, there is a concern that unevenness may occur on the surface due to curing shrinkage of a resin (matrix resin) constituting the fiber impregnated resin and/or a thermal expansion difference (hereinafter, also referred to as "sink mark of fiber impregnated resin") between the matrix resin and the fiber. Unevenness adjustment such as polishing, filling with putty, and application of surfacer is performed for processing of surface unevenness, and as surface finishing, an easily adhesive film, a rigid film, or the like are laminated for a design and to impart durability. In the integrally molded article with the fiber impregnated resin obtained by such a surface treatment, reflection at an interface between the fiber impregnated resin and the easily adhesive film remains, and a reflected image can be seen askew, so that improvement of image clarity is required.

The present inventors have found out that, when the easily molded layer b1 constituting the base material film B has a storage modulus at 23° C. of a specific numerical value or more, the easily molded layer b1 has appropriate flexibility and hardness, and has excellent adhesion to the easily adhesive layer A, and the surface coating film containing the easily molded layer b1 and the easily adhesive layer A has image clarity.

Further, by setting the ratio of the storage modulus of the easily molded layer b1 to the storage modulus of the flat layer b2 to the range defined in the above formula 1 at 150° C., the easily molded layer b1 alleviates deformation of the matrix resin due to curing shrinkage or thermal expansion difference when integrally molded with the above fiber impregnated resin, and unevenness derived from the fiber impregnated resin due to deformation of the matrix resin is difficult to influence a surface shape of an outermost layer by having the flat layer b2, and as a result, it is inferred that the surface coating film according to the present invention has excellent image clarity.

Since the easily molded layer b1 has a certain degree of hardness at normal temperature, it is considered that handling during integral molding is good and scratches (hereinafter also referred to as "damage") of the surface coating film are easily reduced. In addition, since the surface coating film according to the present invention includes the easily adhesive layer A, it is inferred that the easily molded layer b1 and the matrix resin can be caused to firmly adhere to each other and image clarity is excellent.

Hereinafter, each configuration of the coating film according to the present invention will be described below.

<Base Material Film B>

The surface coating film according to the present invention includes the base material film B and the easily adhesive layer A provided on the base material film B, the base material film B including the easily molded layer b1 adjacent to the easily adhesive layer A and the flat layer b2, in which the base material film B has a thickness of 50 µm to 500 µm.

The thickness of the base material film B is a total distance in the thickness direction of a multilayer including the easily molded layer b1 adjacent to the easily adhesive layer A, the flat layer b2, and the other layer (the oher layer b3 to be described later) except the easily molded layer b1 and the flat layer b2 provided according to cases.

When the thickness of the base material film B is in a range of 50 µm to 500 µm, processability when integrally molded with a fiber impregnated resin to be described later is excellent, and flatness of the surface coating film is excellent when coated on a surface of a fiber impregnated resin to be described later.

From the above viewpoints, the thickness of the base material film B is preferably 75 µm or more, more preferably 100 µm or more, and even more preferably 125 µm or more. From the above viewpoints, the thickness of the base material film B is preferably 300 µm or less, more preferably 250 µm or less, still more preferably 240 µm or less, further more preferably 188 µm or less, particularly preferably 130 µm or less, and extremely preferably less than 100 µm.

The thickness of the base material film B can be determined from an image obtained by observing a cross section of the base material film B with a stereomicroscope and a scale.

In view of achieving both moldability and flatness in the integral molding, the base material film B is preferably a biaxially oriented film in which a molecular chain is oriented in two directions orthogonal to each other in the plane by stretching the film.

—Easily Molded Layer b1—

The base material film B used in the present invention includes the easily molded layer b1 adjacent to the easily adhesive layer A.

The easily molded layer b1 satisfies the following formula 2. When the easily molded layer b1 satisfies the formula 2, that is, when the storage modulus $ELb1$ of the easily molded layer b1 at 23° C. is 1000 MPa or more, it is considered that the easily molded layer b1 has an appropriate softness, the moderate softness improves the adhesion to the easily adhesive layer A to be described later, and the softness and the adhesion are combined so that the surface coating film has excellent image clarity. In addition, when the easily molded layer b1 satisfies the formula 2, handling during integral molding is good, and damage is easily reduced.

$$1000 \text{ MPa} \leq \text{storage modulus } ELb1 \text{ of the easily molded layer } b1 \text{ at } 23° \text{ C.} \quad \text{Formula 2}$$

In view of excellent image clarity, the storage modulus ELb1 at 23° C. is preferably 2000 MPa or more, preferably 2000 MPa or more and less than 4000 MPa, more preferably 2000 MPa to 3500 MPa, and even more preferably 2500 MPa to 3000 MPa. The storage modulus ELb1 of the easily molded layer b1 at 23° C. is measured using a dynamic viscoelasticity measurement device (product name: DMA8000, manufactured by PerkinElmer) while pulling the easily molded layer b1 in a MD direction with a tension jig at a frequency of 1 Hz and raising temperature. From the measurement results, the storage modulus at 23° C. can be obtained.

In the present description, the "MD direction" means a machine direction of a film, that is, a longitudinal direction.

In view of image clarity, the easily molded layer b1 preferably further satisfies the following formula 3.

$$10 \text{ MPa} \leq \text{storage modulus } EHb1 \text{ of easily molded layer } b1 \text{ at } 150° \text{ C.} \leq 950 \text{ MPa} \quad \text{Formula 3}$$

The storage modulus EHb1 of the easily molded layer b1 at 150° C. can be obtained by the same method as the storage modulus ELb1 of the easily molded layer b1 at 23° C.

In view of image clarity, the storage modulus EHb1 of the easily molded layer b1 at 150° C. is preferably 20 MPa to 500 MPa, and more preferably 30 MPa to 200 MPa.

The easily molded layer b1 and the flat layer b2 to be described later satisfy the following formula 1. Since the easily molded layer b1 and the flat layer b2 satisfy the following formula 1, the curing shrinkage and thermal expansion difference of the matrix resin are alleviated in the thickness direction at a processing temperature during the integral molding, and the image clarity is excellent.

$$3 \leq \text{ratio } (EHb2/EHb1) \text{ of storage modulus } EHb2 \text{ of the flat layer } b2 \text{ at } 150° \text{ C. to storage modulus } EHb1 \text{ of the easily molded layer } b1 \text{ at } 150° \text{ C.} \quad \text{Formula 1}$$

In view of excellent image clarity, EHb2/EHb1 is 3 or more, preferably 6 or more, more preferably 10 or more, and even more preferably 20 or more. In view of handling, EHb2/EHb1 is preferably 50 or less, more preferably 45 or less, and still more preferably 40 or less. In addition, in view of ensuring higher image clarity and moderate handleability, EHb2/EHb1 is preferably in a range of 10 to 45. On the other hand, in view of ensuring high handleability while maintaining image clarity to some extent, EHb2/EHb1 is preferably in a range of 3 to 9.

The storage modulus EHb2 of the flat layer b2 at 150° C. can be obtained by the same method as the storage modulus ELb1 of the easily molded layer b1 at 23° C.

The easily molded layer b1 is preferably a layer containing a thermoplastic resin.

As the layer containing a thermoplastic resin, a resin film made of a thermoplastic resin can be suitably used.

The thermoplastic resin used in the easily molded layer b1 may be used in one kind alone or in combination of two or more kinds thereof.

The thermoplastic resin is not particularly limited as long as it can be molded into a film or a sheet.

As the specific thermoplastic resin, those publicly known per se can be used, such as: polyolefin resins such as polyethylene, polypropylene, and poly(4-methyl pentene-1); cycloolefins such as a ring-opened metathesis polymer, an addition polymer, and an addition copolymer with other olefins of norbornenes; biodegradable polymers such as polylactic acid and polybutylene succinate; polyamide resins (including semi-aromatic polyamides) such as nylons 6, 11, 12, and 66; polymethyl methacrylate; polyvinyl chloride; polyvinylidene chloride; polyvinyl alcohol; polyvinyl butyral; ethylene vinyl acetate copolymer; polyacetal; polyglycolic acid; polystyrene; styrene copolymerized polymethyl methacrylate; polycarbonate; polyester resins such as polypropylene terephthalate, polyethylene terephthalate (PET), polyethylene isophthalate (IAPET), polybutylene terephthalate (PBT), and polyethylene-2,6-naphthalate (PEN); polyethersulfone; polyetherketone; modified polyphenylene ether; polyphenylene sulfide; polyetherimide; polyimide; polyarylate; a tetrafluoroethylene-hexafluoropropylene copolymer; polyvinylidene fluoride; and an acrylonitrile-butadiene-styrene copolymer.

Among these, since flatness is more easily revealed and transparency that contributes to glossiness is easily imparted when the surface of the fiber impregnated resin is coated, the thermoplastic resin is preferably at least one resin selected from the group consisting of a polymethyl methacrylate resin, a polycarbonate resin, and a polyester resin, and particularly more preferably a polyester resin since it is easy to provide flatness by stretching or the like.

These resins may be a homopolymer, a copolymer (copolymerization polymer), or a mixture of thermoplastic resins.

The thermoplastic resin may be, for example, a thermoplastic resin composition obtained by adding additives such as an antioxidant, an antistatic agent, a crystal nucleating agent, an inorganic particle, an organic particle, a viscosity-reducing agent, a heat stabilizer, a lubricant, an infrared absorber, an ultraviolet absorber, and a doping agent for adjusting a refractive index.

When the polyester resin is used as the thermoplastic resin, examples of the polyester resin preferably include a polyester resin obtained by polymerization of a monomer synthesized from: an aromatic dicarboxylic acid or an aliphatic dicarboxylic acid or an ester-forming derivative thereof; and a diol or an ester-forming derivative thereof, and those known per se can be used.

The aromatic dicarboxylic acid is not particularly limited, and examples thereof include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylsulfone dicarboxylic acid, 4,4'-diphenyl dicarboxylic acid, 2,5-furan dicarboxylic acid, and ester-forming derivatives thereof.

The aliphatic dicarboxylic acid is not particularly limited, and examples thereof include adipic acid, sebacic acid, dimer acid, dodecanedioic acid, cyclohexane dicarboxylic acid, and ester-forming derivatives thereof.

Among these, the dicarboxylic acid used in the polyester resin is preferably an aromatic dicarboxylic acid, and more preferably terephthalic acid, isophthalic acid, 2,6-naphthalene dicarboxylic acid, or ester-forming derivatives thereof since it is possible to have excellent heat resistance and flatness after integral molding.

These acid components may be used in one kind alone or in combination of two or more kinds thereof, and may be partially copolymerized with an oxyacid of hydroxybenzoic acid or the like.

Examples of the diol include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol, 2,2-bis(4-hydroxy ethoxy phenyl) propane, isosorbide, spiroglycol, and ester-forming derivatives thereof.

Among these, the diol is preferably at least one diol selected from the group consisting of ethylene glycol, 1,3-butanediol and 1,4-butanediol, and ester-forming derivatives thereof since it is possible to have excellent heat resistance and flatness after integral molding.

These diol components may be used in one kind alone or in combination of two or more kinds thereof.

When the polyester resin is used as the thermoplastic resin, in view of achieving both moldability and flatness, the polyester resin is preferably a polyester resin having a constituent unit derived from at least one monomer selected from the group consisting of ethylene terephthalate, ethylene isophthalate, ethylene naphthalene dicarboxylate, butylene terephthalate, butylene naphthalene dicarboxylate, hexamethylene terephthalate, hexamethylene naphthalene dicarboxylate, 1,4-cyclohexane dimethylene terephthalate, ethylene furanoate, and 1,4-cyclohexane dimethylene naphthalene dicarboxylate, and more preferably a polyester resin having a constituent unit derived from at least one monomer selected from the group consisting of ethylene terephthalate, butylene terephthalate, and ethylene isophthalate.

The polyester resin is not limited to a homopolymer of the monomer, but may be a copolymer using two or more of the monomers or a mixture of two or more polyester resins.

In view of moldability during the integral molding and image clarity, the polyester resin is preferably a mixture of two or more polyester resins, more preferably a mixture containing at least two kinds selected from the group consisting of polyethylene terephthalate, polyethylene isophthalate, and polybutylene terephthalate, and further more preferably a mixture of polyethylene isophthalate and polybutylene terephthalate.

In view of excellent moldability during the integral molding, the polyester resin is preferably a polyester resin having a constituent unit derived from at least one selected from the group consisting of butylene terephthalate and ethylene isophthalate.

In particular, since moldability during the integral molding is excellent, it is particularly preferable that the polyester resin is obtained by copolymerizing 80 mol % or more of the constituent unit derived from butylene terephthalate and ethylene isophthalate and 2 mol % to 20 mol % of constituent units derived from monomers other than butylene terephthalate and ethylene isophthalate with respect to all constituent units constituting the polyester resin based on the number of moles.

A weight average molecular weight of the thermoplastic resin used in the easily molded layer b1 is preferably 50,000 to 90,000, more preferably 60,000 to 80,000.

The weight average molecular weight can be obtained by the following measurement method.

A thermoplastic resin sample is frozen and crushed, and 1 mg of the sample is dissolved overnight in 4 mL of a mixed solvent of hexafluoro isopropanol (HFIP): chloroform=1:1, the solution is diluted with 6 mL of chloroform and then filtrated by a 0.45 μm membrane filter to obtain a measurement solution.

The measurement solution produced by the above method is measured with a gel permeation chromatography (GPC) analysis apparatus under the following conditions. The weight average molecular weight was calculated as a conversion value of standard polystyrene.

Device name: model number: HLC-8320GPC manufactured by Tosoh Corporation

Column: TSK-GEL GMHHR-M (manufactured by Tosoh Corporation)×2

Flow rate: 1.0 mL/min

Column temperature: 40° C.

Detector: UV

Injection amount: 200 μL

The easily molded layer b1 may contain a colorant in addition to the thermoplastic resin. Examples of the colorant include a colorant used in a decorative layer to be described later.

A thickness of the easily molded layer b1 is preferably 1 μm or more, more preferably 5 μm or more, still more preferably 10 μm or more, even more preferably 25 μm or more, and particularly preferably 30 μm or more since it is easy to make a layer having sufficient hardness and strength. The thickness of the easily molded layer b1 is preferably 475 μm or less, more preferably 470 μm or less, still more preferably 350 μm or less, and even more preferably 250 μm or less since it is easy to make a layer having necessary softness.

—Flat Layer b2—

The base material film B used in the present invention includes a flat layer b2, and the flat layer b2 satisfies the above formula 1. The flat layer b2 is preferably a layer provided on the described easily molded layer b1, and more preferably a layer provided on the easily molded layer b1 and adjacent to the easily molded layer b1.

When the flat layer b2 is an outermost layer of the surface coating film, it may function as a protective layer.

The flat layer b2 is preferably a layer containing a thermoplastic resin in view of maintaining durability while expressing design of a texture.

The thermoplastic resin used in the flat layer b2 has the same meaning as the thermoplastic resin in the described easily molded layer b1.

Since flatness is more easily revealed and transparency that contributes to glossiness is easily imparted when the surface of the fiber impregnated resin is coated, the thermoplastic resin used in the flat layer b2 is preferably at least one resin selected from the group consisting of a polymethyl methacrylate resin, a polycarbonate resin, and a polyester resin, and particularly more preferably a polyester resin since it is easy to provide flatness by stretching or the like.

Specific examples of the polyester resin used in the flat layer b2 are the same as specific examples of the polyester resin used in the easily molded layer b1.

The polyester resin used in the flat layer b2 may be a homopolymer, a copolymer using two or more monomers, or a mixture of two or more polyester resins, but is preferably a homopolymer or a copolymer, and more preferably a homopolymer.

The homopolymer of the polyester resin is preferably polyethylene terephthalate (PET), polyethylene isophthalate (IAPET), polybutylene terephthalate (PBT), or polyethylene-2,6-naphthalate (PEN), and more preferably polyethylene terephthalate (PET) or polyethylene-2,6-naphthalate (PEN).

A thickness of the flat layer b2 is preferably 25 μm to 499 μm, more preferably 25 μm to 495 μm, further more preferably 25 μm to 490 μm, still more preferably 25 μm to 475 μm, even more preferably 25 μm to 470 μm, particularly preferably 25 μm to 350 μm, and extremely preferably 30 μm 250 μm.

The thickness of the flat layer b2 can be determined from an image obtained by observing the cross section of the base material film B including the easily molded layer b1 and the flat layer b2 with a stereomicroscope and a scale.

—The Other Layer—

If the thickness of the base material film B is in a range of 50 μm to 500 μm, the base material film B used in the present invention may have a layer (hereinafter, also referred to as "the other layer b3") other than the easily molded layer b1 and the flat layer b2, but preferably does not have the layer since it causes excess reflection to form an unnecessary interface in view of revealing image clarity.

When the base material film B used in the present invention includes the other layer b3, the other layer b3 may be a layer containing a resin other than the thermoplastic resin used in the easily molded layer b1 and the flat layer b2, and more preferably a layer containing an olefin resin or an acrylic resin.

<Easily Adhesive Layer A>

The easily adhesive layer A of the surface coating film according to the present invention has a thickness of 30 nm to 250 nm (0.030 μm to 0.250 μm). In the surface coating film, the easily adhesive layer A is a layer adjacent to the described easily molded layer b1.

When the thickness of the easily adhesive layer A is in the above range, the image clarity is excellent.

The thickness of the easily adhesive layer A is preferably 40 nm or more, more preferably 60 nm or more, and even more preferably 75 nm or more in view of image clarity and adhesion.

An upper limit of the thickness of the easily adhesive layer A is preferably 180 nm or less, more preferably 150 nm or less, and even more preferably 120 nm or less in view of coating thickness, spot reduction, and durability adhesion.

The thickness of the easily adhesive layer A can be calculated from an image and scale, the image obtained by: preparing a sample in which the surface coating film according to the present invention is embedded with an epoxy resin; producing an ultrathin section by using a microtome (product name: RM2255, manufactured by Leica Camera AG) after the sample is cured at normal temperature for one day; and observing a cross section of the ultrathin section with a TEM (transmission electron microscope).

The easily adhesive layer A preferably contains: a binder resin; a crosslinking agent (hereinafter, also referred to as a "specific crosslinking agent") having at least one functional group (hereinafter, also referred to as a "specific functional group") selected from the group consisting of an epoxy group, an oxazoline group, a melamine group, a silanol group, and an isocyanate group; and a cured product of the binder resin and the crosslinking agent. Here, the melamine group is not a formal chemical term, but here refers to a so-called melamine skeleton in which nitrogen atoms (which are not nitrogen atoms in a triazine ring) are to be bonded to each of three carbon atoms constituting the triazine ring represented by a 1,3,5-triazine ring.

Since the easily adhesive layer A contains the binder resin, the specific crosslinking agent, and the cured product thereof, adhesion between a fiber impregnated resin to be described later and a fiber impregnated resin after integral molding is excellent.

<<Specific Crosslinking Agent>>

In view of adhesion to the fiber impregnated resin, the specific functional group of the specific crosslinking agent preferably includes at least one functional group selected from the group consisting of an isocyanate group, a silanol group, a melamine group, an epoxy group, and an oxazoline group, and particularly preferably includes an epoxy group.

The number of functional groups of the specific crosslinking agent is preferably two or more in view of improving film-forming properties and the adhesion to the fiber impregnated resin when the easily adhesive layer A is coated onto the base material film B and increasing a curing rate. When the curing rate is decreased, a ratio of a tetrafunctional crosslinking agent to the specific crosslinking agent is preferably reduced.

Examples of the crosslinking agent having an isocyanate group include 2,4-tolylene diisocyanate, 2,6-tolylene diisocyanate, hydrogenated tolylene diisocyanate, 1,3-xylylene diisocyanate, 1,4-xylylene diisocyanate, hexamethylene diisocyanate, diphenylmethane-4,4-diisocyanate, isophorone diisocyanate, 1,3-bis(isocyanato methyl) cyclohexane, tetramethyl xylylene diisocyanate, 1,5-naphthalene diisocyanate, triphenylmethane triisocyanate, and an adduct of these polyisocyanate compounds and a polyol compound such as trimethylolpropane and a biuret or an isocyanurate of these polyisocyanate compounds.

Among these, hexamethylene diisocyanate is preferable in view of hardness of the cured product and paint dispersibility.

Examples of the crosslinking agent having a silanol group include a silane coupling agent represented by a general formula $YRSiX_3$. Here, Y is an organic functional group such as a vinyl group, an epoxy group, an amino group, or a mercapto group; R is an alkylene group such as a methylene group, an ethylene group, or a propylene group; and X is a hydrolyzable group such as a methoxy group or an ethoxy group, or an alkyl group (at least one X in the molecule is a hydrolyzable group). The Y part is particularly preferably an epoxy group. Specific examples of a preferable silane coupling agent include γ-glycidoxy propyl trimethoxy silane, γ-glycidoxy propyl methyl dimethoxy silane, and γ-glycidoxy propyl methyl diethoxy silane. In addition, an organic metal compound containing metals such as zirconium, titanium, and aluminum is preferably classified into alkoxides, chelates, and acylates. Specific examples thereof include, but are not limited to zirconium tetraacetylacetonate, zirconium acetate, titanium acetylacetonate, triethanolamine titanate, and titanium lactate.

The compound having a melamine group preferably includes: a methylol melamine derivative obtained by condensing melamine and formaldehyde; a compound etherified by reacting a lower alcohol such as methyl alcohol, ethyl alcohol, or isopropyl alcohol with the methylol melamine derivative; and a mixture thereof. Examples of the methylol melamine derivative include monomethylol melamine, dimethylol melamine, trimethylol melamine, tetramethylol melamine, pentamethylol melamine, and hexamethylol melamine.

Examples of the crosslinking agent containing an epoxy group include bisphenol A—epichlorohydrin type epoxy resin, ethylene glycol diglycidyl ether, polyethylene glycol diglycidyl ether, glycerin diglycidyl ether, glycerin triglycidyl ether, 1,6-hexanediol diglycidyl ether, trimethylol propane triglycidyl ether, sorbitol polyglycidyl ether, polyglycerol polyglycidyl ether, pentaerythritol polyglycidyl erythritol, and diglycerol polyglycidyl ether. Among these, glycerol polyglycidyl ether or sorbitol polyglycidyl ether is preferable in view of the hardness of the cured product and the paint dispersibility.

As the crosslinking agent having an oxazoline group, a polymer having an oxazoline group is preferable. Such a polymer can be produced by polymerization of an addition polymerizable oxazoline group-containing monomer alone or with the other monomer. Examples of the addition polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, and one of them or a mixture of two or more thereof can be used. Among these, 2-isopropenyl-2-oxazoline is easy to use industrially and suitable, and is preferably copolymerized at a proportion where a content of the oxazoline group in the polymer is 1 mmol/g to 10 mmol/g in view of adhesion. The other monomer is not limited as long as it is a monomer copolymerizable with the addition polymerizable oxazoline group-containing monomer, examples thereof include: (meth)acrylic esters such as an alkyl acrylate and an alkyl methacrylate (an alkyl group includes a methyl group, an ethyl group, an n-propyl group, an isopropyl group, an n-butyl group, an isobutyl group, a t-butyl group, a 2-ethylhexyl group, and a cyclohexyl group); unsaturated carboxylic acids such as acrylic acid, methacrylic acid, itaconic acid, maleic acid, fumaric acid, crotonic acid, styrene sulfonic acid, and salts thereof (such as sodium salt, potassium salt, ammonium salt, and tertiary amine salt); unsaturated nitriles such as acrylonitrile and methacrylonitrile; unsaturated amides such as acryl amide, methacrylamide, N-alkyl acrylamide, N-alkyl methacrylamide, N,N-dialkyl acrylamide, and N,N-dialkyl methacrylate (the alkyl group includes a methyl group, an ethyl group, an n-propyl group, an isopropyl group, an n-butyl group, an isobutyl group, a t-butyl group, a 2-ethylhexyl group, a cyclohexyl group, or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride, and vinyl fluoride; and α,β-unsaturated aromatic monomers such as styrene and α-methyl styrene, and one or two or more monomers thereof can be used.

<<Binder Resin>>

A publicly known binder resin per se can be used as long as it can crosslink with the specific crosslinking agent and is excellent in adhesion with the described base material film B or a fiber impregnated resin to be described later.

As the binder resin, one kind may be used alone, or two or more kinds may be used in combination.

Examples of the binder resin include a polyurethane resin, a copolymer resin of vinyl chloride/vinyl acetate, a copolymer resin of vinyl chloride/vinyl acetate/acryl, a copolymer of acrylic resin/acrylonitrile resin/acrylamide resin, chlorinated polypropylene resin, acrylic resin, polyester resin, polyamide resin, butyral resin, polystyrene resin, nitrocellulose resin, cellulose acetate resin, and silicone resin.

Since a molding temperature preferably reaches about 150° C. in the integral molding, the binder resin is preferably a resin designed to have a glass transition temperature of lower than 150° C., and more preferably contains at least one resin selected from the group consisting of an acrylic resin and a polyester resin having a glass transition temperature of lower than 150° C.

In the present description, the glass transition temperature of the binder resin means a value measured using differential scanning calorimetry (DSC), and can be obtained, for example, by the following measurement method.

A dispersion of the binder resin is taken out to a Petri dish and dried in an oven to produce a binder resin dry solid film. 10 mg of the obtained dry solid film is sampled. Using differential scanning calorimetry (DSC) (product name: Q100 manufactured by TA Instruments), the sample is heated to 160° C. at a temperature rise speed of 20° C./min and is held for 5 minutes, and then rapidly cooled. After a sample temperature returns to room temperature, measurement is performed at the temperature rise speed of 20° C./min again. During the measurement, an intermediate point at which shift of a baseline to an endothermic side is observed is calculated as the glass transition temperature.

The easily adhesive layer A is preferably a layer formed by coating an easily adhesive layer forming application liquid containing the binder resin and the specific crosslinking agent onto the base material film B, and more preferably a layer formed by coating (hereinafter, may be referred to as "in-line coating") the easily adhesive layer forming application liquid on the base material film B in a film production step of the base material film B. In particular, the easily adhesive layer A formed by being coated on the base material film B and stretched once or more as a laminate with the base material film B is preferable.

As a method for producing the surface coating film, the easily adhesive layer A is preferably formed by coating during any one of steps or between the steps until all stretchings to be performed on the unstretched base material film B are completed.

The specific crosslinking agent contained in the easily adhesive layer forming application liquid is preferably used in a dispersed state in a solvent or water.

When the specific crosslinking agent is dispersed in a solvent, examples of the solvent include solvents such as methyl ethyl ketone, butyl acetate, and toluene, which are generally used as the solvent.

When the easily adhesive layer A is formed by applying the easily adhesive layer forming application liquid in film production of the base material film B, since a film producing apparatus of the base material film B is an open system, the specific crosslinking agent is particularly preferably used in dispersed state in water.

The easily adhesive layer forming application liquid may contain a component publicly known as an application liquid such as a surfactant, and an additive such as a filler for slidability, an ultraviolet inhibitor, or an antioxidant may be added in a range in which the effects of the present invention can be obtained.

Examples of the filler include: inorganic fillers such as metal hydroxides, metal oxides, carbonates, sulfates, and clay minerals; and organic fillers such as particles including a crosslinking polymer and particles including a heat resistant polymer.

When the easily adhesive layer forming application liquid contains a filler, the filler is preferably an inorganic filler, and more preferably alumina, silica, or mica.

An average particle diameter of the filler is preferably 0.02 μm to 0.2 μm, and more preferably 0.04 μm to 0.1 μm.

When the easily adhesive layer forming application liquid contains a filler, a content of the filler is preferably 1 mass % to 10 mass %, and more preferably 3 mass % to 5 mass % with respect to the total mass of the easily adhesive layer forming application liquid.

The easily adhesive layer forming application liquid may contain a colorant used in a decorative layer to be described later.

The colorant has the same meaning as the colorant used in the decorative layer to be described later, and preferable embodiments are also the same.

When the easily adhesive layer forming application liquid contains a colorant, a content of the colorant is preferably 1 mass % to 10 mass %, and more preferably 3 mass % to 5 mass % with respect to the total mass of the easily adhesive layer forming application liquid.

Coating of the easily adhesive layer forming application liquid is not particularly limited, and the easily adhesive layer forming application liquid can be coated using publicly known coating facilities such as a roll coater, a gravure coater, a micro gravure coater, a bar coater, a die coater, and a dip coater and publicly known coating methods. Among these, as the coating method, a roll coater is preferably used by a reverse method in order to form a desired thickness uniformly and conveniently.

Examples of a method of drying or curing the easily adhesive layer forming application liquid include a method of heat treatment at 180° C. to 220° C. The easily adhesive layer A is preferably a layer formed by drying and curing the easily adhesive layer forming application liquid by heat treatment, and more preferably a layer formed by heat treatment at 180° C. to 220° C.

In a case where the easily adhesive layer forming application liquid is coated by the in-line coating, when a temperature of heat treatment at the time of biaxial stretching is in the above range, curing can be performed while moderately leaving unreacted specific functional groups in the specific crosslinking agent, so that the adhesion between the fiber impregnated resin and the easily adhesive layer A can be improved in the step of integral molding, and a defective appearance during integral molding can also be controlled by reducing thermal contraction of the base material film B.

From the above viewpoints, the heat treatment temperature is preferably 180° C. to 220° C., more preferably 190° C. to 215° C., and even more preferably 195° C. to 210° C.

Before the in-line coating, a surface treatment such as a corona treatment, a flame treatment, or a plasma treatment may be applied to the base material film B as necessary. Heat treatment time can be set as appropriate to be preferably 1 second to 60 seconds, and more preferably 1 second to 30 seconds.

Further, the heat treatment may be performed by relaxing the base material film B in a longitudinal direction and/or a width direction.

A refractive index of the easily adhesive layer A at a wavelength of 633 nm is preferably 1.50 to 1.58, and more preferably 1.51 to 1.56 in view of image clarity.

The refractive index of the easily adhesive layer A can be obtained by measuring a refractive index of the obtained resin dry solid film at a wavelength of 633 nm after a prepared water dispersed paint is dried in an oven of 80° C. for one day to remove moisture by using a laser refractive index measurement device (product name: Metricon Model 2010 prism coupler, manufactured by Metricon Japan).

<<The Other Layer>>

The surface coating film may further have a layer other than the easily molded layer b1, the flat layer b2, and the easily adhesive layer A (hereinafter also referred to as a "functional layer"). When the surface coating film has a functional layer, the functional layer is preferably formed opposite to the easily adhesive layer A in the surface coating film, and more preferably formed on a surface of the flat layer b2 opposite to the easily adhesive layer A in the surface coating film.

Examples of the functional layer include a decorative layer, a clear pearl layer, and a hard coat layer.

<<Decorative Layer>>

A component constituting the decorative layer is not particularly limited, examples thereof include a binder resin, a pigment, a dye, and further as necessary, an extender pigment, a solvent, a stabilizer, a plasticizer, a catalyst, and a curing agent, and these compounds can be appropriately mixed to form the decorative layer.

The pigment is not particularly limited as a colorant, and examples thereof include: inorganic pigments such as carbon black (ink), iron black, white pigments such as titanium white (titanium dioxide) and antimony white, chrome yellow, titanium yellow, red iron oxide, cadmium red, ultramarine blue, and cobalt blue; organic pigments or dyes such as quinacridone red, isoindolinone yellow, and phthalocyanine blue; metal pigments including scaly foil pieces of brass or the like; titanium dioxide coated mica; and pearl gloss pigments including scaly foil pieces of basic lead carbonate or the like.

The binder resin used for mixing coloring materials preferably has moldability.

<Method for Producing Base Material Film B and Surface Coating Film>

As an embodiment of a method for producing the base material film B and the surface coating according to the present invention, an example in which a biaxially stretched polyester film is used as the base material film B will be described below.

As described above, the base material film B is preferably biaxially stretched, namely a biaxially oriented film. By biaxially stretching the base material film B, improvement of chemical resistance or durability can be anticipated, and strength as a film can be imparted.

A base resin (polyester resin in this example) which is a main component of each layer constituting the base material film B is not particularly limited as long as the easily molded layer b1 and the flat layer b2 satisfy the above formula 1 and formula 2 relating to the storage modulus, and for example, may be obtained by purchasing a commercially available resin raw material and polycondensing the resin raw material by a publicly known method.

As a means for making the easily molded layer b1 and the flat layer b2 satisfy the above formula 1 and formula 2 relating to the storage modulus, information on the storage modulus of the resin may be obtained from academic literatures or a database relating to physical properties of the resin, and configuration or components of each layer may be determined with reference to the information. Of course, the storage modulus of a film produced by obtaining each resin or the storage modulus of a laminated body thereof may be actually measured, or physical properties of the film may be simulated by a computer, and the configuration or components of each layer may be determined based on the information. The physical properties of the surface coating film obtained by performing trial manufacture based on the above information may be measured, and if there is a point not preferable, adjustment or the like of materials or conditions (changing the copolymer composition or additives of the resin and layer thickness, or the like) may be repeated several times to obtain a surface coating film in which the easily molded layer b1 and the flat layer b2 satisfy the formula 1 and the formula 2.

—Preparation Step—

A preparation step includes a step of drying a resin serving as the raw material.

The drying method is not particularly limited, but, for example, drying is preferably performed at 160° C. for about 5 hours in a nitrogen atmosphere, a vacuum atmosphere, or the like. A drying temperature and drying time are not particularly limited as long as a moisture content in the polyester resin is preferably 50 ppm or less.

When melt extrusion is performed using a vented twin screw extruder, the preparation step of drying the raw material resin may be omitted.

—Melt Extrusion Step and Film Production Step—

In the melt extrusion step, the polyester resin raw material obtained in the preparation step is put into an extruder and melt kneaded in a cylinder.

The method for producing the base material film B preferably includes a step (film production step) of removing foreign matters from the molten polyester resin through a filter, leveling an extrusion amount of the molten polyester resin using a gear pump, and ejecting the molten polyester resin through a T die into a sheet form on a cooling drum to form a film.

At this time, the molten polyester resin may be extruded in a single layer, or may be extruded in multiple layers. The melt extruded molten polyester resin is preferably cooled and solidified on a support and formed into a sheet shape.

In the film production step, the polyester resin melt extruded in the melt extrusion step can be cooled to produce a film of a polyester resin sheet (base material film B). In the film production step, by for example, a method of electrostatic application using a wire shaped electrode or a tape shaped electrode, a casting method of providing a water film between a casting drum and the extruded polymer sheet, a method of adjusting a casting drum temperature within a range from a glass transition point of polyester to the glass transition point −20° C. to stick the extruded polymer to the casting drum, or a method that combines a plurality of these methods, the sheet shaped polymer may adhere to the casting drum and be cooled and solidified to obtain an unstretched polyester resin film (base material film).

Among these casting methods, the electrostatic application method is preferable in view of productivity and planarity of the polyester resin.

—Formation Step of Easily Adhesive Layer A—

A formation step of the easily adhesive layer A is preferably performed during any one of steps or between the steps until all stretchings to be performed on the unstretched base material film B are completed.

A step of forming the easily adhesive layer A exemplifies a step of forming the easily adhesive layer A by coating (in-line coating) the described easily adhesive layer forming application liquid to the base material film B having a temperature suitable for coating at the end of or after the film production step of the base material film B.

A coating method of the easily adhesive layer forming application liquid and the heat treatment conditions or the like are described above, which may also be applied to formation of the other layer of the surface coating film.

—Stretching Step—

In a stretching step, examples of a method of stretching the unstretched polyester film obtained in the melt extrusion step include a sequential biaxial stretching method in which the unstretched polyester film is stretched in the longitudinal direction and then stretched in the width direction or the unstretched polyester film is stretched in the width direction and then stretched in the longitudinal direction, or a simultaneous biaxial stretching method in which the unstretched polyester film is stretched in the longitudinal direction and the width direction almost simultaneously, which can be appropriately selected.

A stretch ratio varies depending on the type of resin, but stretch is performed in the width direction and the longitudinal direction at preferably 2.5 times to 4.0 times, more preferably 2.8 times to 3.5 times, and further more preferably 3.0 times to 3.4 times.

An area magnification is preferably 6 times to 20 times in view of film formation stability, and more preferably 8 times to 20 times when the film uses polyethylene terephthalate (PET).

A stretching speed is desirably 1,000%/min to 200,000%/min in an extending direction of the width direction and the longitudinal direction.

A stretching temperature may be employed preferably within the glass transition temperature or higher to the glass transition temperature+120° C. or lower, and more preferably within the glass transition temperature+10° C. to the glass transition temperature+60° C. For example, it is preferable that the stretching temperature is 75° C. to 130° C. when the polyethylene terephthalate film is stretched, particularly preferably a stretching temperature in the longitudinal direction is 80° C. to 120° C. and a stretching temperature in the width direction is 90° C. to 110° C.

The stretching may be performed a plurality of times in each direction.

A stretching method can apply a publicly known and used method, and for example, a roll stretching method or a stretching method of guiding the film to a tenter and transporting the film while gripping both ends of the film with clips can be used.

—Heat Treatment Step—

In order to impart flatness and dimensional stability, the biaxially stretched surface coating film is more preferably subjected to a heat treatment at the stretching temperature or higher and a melting point or lower in the tenter.

In order to prevent orientation distribution in the width direction, the biaxially stretched surface coating film is preferably relaxed in the longitudinal direction instantaneously immediately before and/or immediately after entering a heat treatment zone.

After the heat treatment, the biaxially stretched surface coating film is uniformly annealed, cooled to room temperature, and then wound up.

The relaxation treatment may be performed as necessary in the longitudinal direction and/or the width direction at the time of the heat treatment to the annealing.

In the surface coating film according to the present invention obtained by the production method, elongation at 150° C. is preferably 100% or more in the film production direction and the width direction. An upper limit of the elongation at 150° C. is not particularly limited, and is preferably as high as possible.

When the elongation at 150° C. of the surface coating film is 100% or more in the film production direction and the width direction, the surface coating film can follow a shape of a fiber reinforced resin to be described later.

The surface coating film increases a tensile stress when expanded. Since the tensile stress of the surface coating film is resistance force against a molding force at the time of integral molding with the fiber reinforced resin, the tensile stress is preferably low. On the other hand, when the tensile stress is too low, a protrusion or the like of the base material shape is excessively stretched, which easily cause defects such as thickness unevenness.

In view of smoothness, the tensile stress at 150° C. of the surface coating film is preferably 3 MPa to 50 MPa, and more preferably 5 MPa to 30 MPa.

The tensile stress of the surface coating film preferably tends to monotonically increase with expansion. The "monotonically increase with expansion" means that, when the elongation is a horizontal axis and the stress is a vertical axis, a region of the elongation where an increase in the tensile stress is 0 or negative in a stage until break, that is, a region of the elongation where a gradient is zero or less in a stage until break is 30% or less of the elongation at break, and further 20% or less of the elongation at break.

In the surface coating film according to the present invention, as a result obtained by the above production method, an absolute value $\Delta\chi$ of a thermal contraction difference when thermal contraction in the film production direction at 150° C. is $\chi$MD and thermal contraction in the width direction is $\chi$TD preferably satisfies the following formula (1).

$$\Delta\chi=|\chi MD-\chi TD|\leq 3.0 \tag{1}$$

When $\Delta\chi$ is 3.0 or less, the thermal contraction difference of the base material film B is small, and the appearance after the integral molding can be kept good. If a lower limit of $\Delta\chi$ dares to be provided, $\Delta\chi$ is preferably 0.1 or more, more preferably 0.3 or more, still more preferably 0.5 or more, even more preferably 1.0 or more, and particularly preferably 1.5 or more in that it is easy to satisfy the lower limit even in production on an industrial scale.

The surface coating film according to the present invention preferably has a total light transmittance of 80% or more with respect to visible light.

Since the total light transmittance is 80% or more, when, for example, carbon fibers are contained as the fiber reinforced resin, the texture of the carbon fibers can be expressed as design. When a decorative layer or the like is provided, the design of the decorative layer can be revealed more effectively. The total light transmittance is more preferably 82% or more, and still more preferably 85% or more.

(Surface-Coated Fiber-Reinforced Resin Molded Article)

The surface-coated fiber-reinforced resin molded article according to the present invention (hereinafter, also referred to as a "fiber reinforced resin molded article") is a molded article in which the surface coating film and the fiber impregnated resin are integrally molded.

—Fiber Impregnated Resin—

The fiber impregnated resin includes a fiber and a resin (hereinafter, also referred to as a "matrix resin"), in which a part or all of an interior of the fiber is impregnated with the matrix resin and the fiber and the matrix resin are integrated.

The matrix resin contained in the fiber impregnated resin may be a thermosetting resin or a thermoplastic resin, but is preferably a thermosetting resin.

When the matrix resin is a thermoplastic resin, the thermoplastic resin is not particularly limited, and examples thereof include polyolefins (such as polyethylene, polypropylene, polybutylene, and polystyrene), polyamides (such as nylon 6, nylon 66, nylon 11, nylon 12, nylon 610, and semi-aromatic nylon), polyimide, polyamide-imide, polycarbonate, polyesters (such as polyethylene terephthalate, polybutylene terephthalate, and polypropylene terephthalate), polyphenylene sulfide, polysulfoxide, polytetrafluoroethylene, acrylonitrile butadiene styrene copolymer, polyacetal, polyether, polyether ether ketone, polyoxymethylene, and thermoplastic epoxy resin. The thermoplastic resin may be a derivative of the above thermoplastic resin, a copolymer of the above thermoplastic resin, or a mixture thereof.

When the matrix resin is a thermoplastic resin, a molding temperature (Ts) at the time of integrally molding the surface coating film and the fiber impregnated resin is preferably lower than a softening point (Tn) of the resin contained in the base material film B, more preferably satisfies a relationship of Tn≤Ts−10° C., and still more preferably satisfies a relationship of Tn≤Ts−20° C.

When the matrix resin is a thermosetting resin, the thermosetting resin is not particularly limited, and examples thereof include a thermosetting epoxy resin, an unsaturated polyester resin, a vinyl ester resin, a phenol resin, a melamine resin, a polyurethane resin, a silicone resin, a maleimide resin, a cyanate ester resin, and a resin obtained by pre-polymerizing the maleimide resin and the cyanate ester resin. A mixture of these resins may be used.

When the article is applied to the fiber reinforced composite material, the thermosetting resin is preferably an epoxy resin in view of excellent heat resistance, elastic modulus, and chemical resistance.

When the matrix resin is a thermosetting resin, curing time at 150° C. is preferably 10 minutes or less as the curing rate of the thermosetting resin. In terms of shortening the curing time and improving moldability, the thermosetting resin is preferably an epoxy resin in which the curing time at 150° C. is 10 minutes or less as the curing rate.

When the matrix resin is a thermosetting resin, a glass transition temperature of the thermosetting resin is preferably 80° C. or higher, more preferably 90° C. or higher, and even more preferably 100° C. or higher. When the glass transition temperature of the thermosetting resin is 80° C. or higher, even in a case where an ambient temperature is 80° C. or higher during use of a surface coated laminate, the cured product of the thermosetting resin is difficult to get in a rubber state, so that smoothness of the surface of the surface coating film is easily kept.

The glass transition temperature of the thermosetting resin can be obtained by, for example, the same method as that of the glass transition temperature of the described binder resin.

A rate of content (RC) of the matrix resin is preferably 20 mass % to 60 mass %, more preferably 20 mass % to 50 mass %, and still more preferably 25 mass % to 45 mass % based on a total mass of the fiber impregnated resin.

When the rate of content of the matrix resin is 20 mass % or more, a void or the like is difficult to occur in a molded article to be obtained, and mechanical properties or the like are easily imparted. When the rate of content of the resin is 60 mass % or less, a reinforcing effect by the fiber can be obtained, and mechanical properties or the like can be imparted.

Here, the rate of content (RC) of the matrix resin is obtained by immersing the fiber impregnated resin in sulfuric acid and eluting the matrix resin impregnated in the fiber impregnated resin. Specifically, the rate of content (RC) of the matrix resin is obtained by the following method.

First, the fiber impregnated resin is cut into 100 mm×100 mm to produce a test piece, and a mass thereof is measured. Next, the test piece of the fiber impregnated resin is immersed in sulfuric acid and boiled as necessary. Thus, the resin impregnated in the fiber impregnated resin is decomposed and eluted in the sulfuric acid. Thereafter, the remaining fibers are filtered and washed with water, and then dried to measure a mass of the fibers. The rate of content of the matrix resin can be calculated from a mass change before and after the decomposition operation by sulfuric acid.

The fibers contained in the fiber impregnated resin are not particularly limited, and examples thereof include glass fibers, carbon fibers, aramid fibers, boron fibers, alumina fibers, basalt fibers, and silicon carbide fibers. These fibers may be used in one kind alone or in combination of two or more kinds thereof. In view of obtaining a lighter and more durable molded article, the fiber impregnated resin preferably contains carbon fibers.

The shape of the fiber contained in the fiber impregnated resin is preferably a sheet shaped fiber (fiber reinforced sheet). The fiber reinforced sheet is not particularly limited, and examples thereof include a sheet in which a plurality of fibers are aligned in one direction, a bidirectional fabric such as plain weave or twill weave, a multiaxial fabric, a nonwoven fabric, a mat, a knit, a braid, and a paper made of a reinforced fiber.

A content of the fiber contained in the fiber impregnated resin is preferably 40 mass % to 80 mass % with respect to the total mass of the fiber impregnated resin. Since the content of the fiber is 40 mass % or more with respect to the mass of the fiber impregnated resin, mechanical properties of the obtained surface coated laminate can be improved. When the content of the fiber is 80 mass % or less, it is possible to reduce a decrease in fluidity at the time of molding and to sufficiently impregnate the fiber with a resin component of the fiber impregnated resin, and as a result, the mechanical properties can be improved.

When the content of the fiber is in the above range, smoothness of the surface coating film or the surface coated laminate can be improved, and an appearance of a laminated sheet can be further improved.

When the fiber reinforced sheet is a multiaxial fabric, preferable examples of the multiaxial fabric include [+45/−45], [−45/+45], [0/90], [0/+45/−45], [0/−45/+45], and [0/+45/90/−45].

The 0, ±45, and 90 represents a lamination angle of each layer constituting the multiaxial fabric, and indicate that a fiber axial direction of the reinforced fiber aligned in one direction is 0°, ±45°, and 90° respectively with respect to a length direction of the fabric. The lamination angle is not limited to these angles, and can be any angle.

A basis weight of the multiaxial fabric is preferably 200 g/m$^2$ to 1000 g/m$^2$, more preferably 200 g/m$^2$ to 800 g/m$^2$ per sheet.

When the fiber reinforced sheet is a bidirectional fabric, examples of the bidirectional fabric include publicly known fabrics such as plain weave, sateen weave, and twill weave.

A basis weight of the bidirectional fabric is preferably 60 g/m$^2$ to 400 g/m$^2$, and more preferably 60 g/m$^2$ to 250 g/m$^2$ per sheet.

When the fiber reinforced sheet is a mat or a made paper, a number average fiber length of the fibers is preferably 0.1 mm to 100 mm More preferably, the number average fiber length of the fibers is 0.5 mm to 50 mm.

By setting the number average fiber length of the fibers to 0.1 mm or more, a reinforcing effect by the fiber can be improved. On the other hand, by setting the number average fiber length of the reinforced fibers to 100 mm or less, it is possible to reduce spring back of the surface coating film and to further improve the smoothness of the surface coating film, and it is possible to reduce occurrence of cracks (fissures) or cavities inside the surface coating film.

As a method for measuring the number average fiber length of the fibers contained in the fiber impregnated resin, the number average fiber length can be confirmed by a method (burning off method) of: performing a heat treatment in a temperature range in which fibers are not oxidized and reduced to burn off the resin component (matrix resin) only of the fiber impregnated resin and separate the fiber from the resin component; then randomly selecting 400 fibers by observation with an optical microscope; measuring lengths of the selected fibers up to 1 μm; and calculating a number average value thereof to obtain the number average fiber length. The burning off method can also be applied to a case where there is no solvent for dissolving the matrix resin.

(Method for Producing Surface-Coated Fiber-Reinforced Resin Molded Article)

The surface-coated fiber-reinforced resin molded article (fiber reinforced resin molded article) can be produced by connecting the easily adhesive layer A in the surface coating film according to the present invention with the fiber impregnated resin and integrally molding the surface coating film and the fiber impregnated resin.

An embodiment of the method for producing the fiber reinforced resin molded article according to the present invention includes a step (integral molding step) of connecting the easily adhesive layer A in the surface coating film with the fiber impregnated resin and integrally molding the surface coating film and the fiber impregnated resin.

Hereinafter, preferable embodiments of each step of the method for producing the fiber reinforced resin molded article according to the present invention and the fiber reinforced resin molded article according to the present invention will be described in order.

In the method for producing the fiber reinforced resin molded article, a method for producing the described surface coating film may be further included as a step.

Each step of the method for producing the surface coating film is as described above, and the preferable embodiments of each step of the method for producing the surface coating film in the method for producing the fiber reinforced resin molded article have the same meaning as those of each step of the method for producing the surface coating film.

<Integral Molding Step>

A step included in the method for producing a fiber reinforced resin molded article according to the present invention is a step of integrally molding the fiber impregnated resin and the surface coating film according to the present invention, preferably a step of integrally molding the fiber impregnated resin and the surface coating film by heat and pressure molding.

In the integral molding by heat and pressure molding, when a thermosetting resin such as an epoxy resin is used as the matrix resin of the fiber impregnated resin, the matrix resin can be cured at the same time as the integral molding. When the thermoplastic resin is used as the matrix resin of the fiber impregnated resin, the integral molding can be performed while softening the matrix resin, and thus production efficiency is excellent.

The heat and pressure molding method is not particularly limited, and can employ a press molding method, an autoclave molding method, a bagging molding method, a wrapping tape method, an internal pressure molding method, or the like, but the press molding method is preferable in view of enhancing adhesion with the matrix resin at the same time as the integral molding.

A molding temperature (or curing time) in the heat and pressure molding method may be appropriately selected depending on the selected matrix resin, and for example, when the epoxy resin composition is used as the matrix resin, a temperature of generally 80° C. to 180° C. is preferable in view of fast curability though depending on the type of a curing agent contained in the composition.

A molding pressure in the press molding method varies depending on the thickness or the like of the fiber impregnated resin, but is preferably a pressure of 0.1 MPa to 5 MPa in general. Since heat can be sufficiently conveyed to the inside of the fiber impregnated resin and the resin contained in the fiber impregnated resin can be sufficiently cured when the pressure is 0.1 MPa to 5 Mpa, occurrence of warpage is reduced, and a surface appearance is also excellent.

The integral molding step is preferably a step of integrally molding the fiber impregnated resin at 150° C. for 10 minutes or less.

When the curing conditions are at 150° C. and for 10 minutes or less, time until the curing ends can be shortened, and the moldability can be further improved.

EXAMPLES

Hereinafter, the present invention will be described in more detail by Examples, but the present invention is not limited thereto. Each value in this Example was obtained by the following method.

<Preparation of Easily Adhesive Layer Forming Application Liquid>

The easily adhesive layer forming application liquid was prepared by mixing a specific crosslinking agent and a binder resin at a ratio shown in Table 1. In the easily adhesive layer forming application liquid, a main binder resin dispersion paint and an additive paint such as a curing agent dispersion paint were added to ion exchange water, and stirred and dispersed to obtain a water dispersion paint. The easily adhesive layer forming application liquid was prepared so that a surfactant was further added as necessary and a total in solid contents was 100%, and stirred and dispersed so that a solid content concentration of the easily adhesive layer forming application liquid was 3%.

Further, the easily adhesive layer forming application liquid was supplied by a pump and passed through a filter to remove foreign matter, and then stored in an application liquid pan, which was used in production of the surface coating film.

The binder resin contained in the easily adhesive layer forming application liquid is as follows.

<<Acrylic A>>

An acrylic resin copolymer obtained by performing an addition condensation reaction of 40 mol % of methyl methacrylate, 45 mol % of ethyl acrylate, 10 mol % of acrylonitrile, and 5 mol % of N-methylol acrylamide.

The weight average molecular weight is 220,000. The weight average molecular weight was measured by the described method. The weight average molecular weight was measured in the same manner below.

<<Acrylic B>>

An acrylic resin copolymer obtained by performing an addition condensation reaction of 75 mol % of methyl methacrylate, 20 mol % of ethyl acrylate, and 5 mol % of N-methylol acrylamide.

The weight average molecular weight is 200,000. The weight average molecular weight was measured by the described method. The weight average molecular weight was measured in the same manner below.

<<Polyester>>

A polyester resin in which a polyester resin 1 and a polyester resin 2 composed of the following copolymerization components are blended at a mass ratio of 1:1. The weight average molecular weight is 21,000.

Polyester resin 1: a polyester resin obtained by synthesis using 40 mol % of terephthalic acid as a carboxylic acid component and 60 mol % of ethylene glycol as a glycol component. The weight average molecular weight is 20,000.

Polyester resin 2: a polyester resin obtained by synthesis using 65 mol % of naphthalenedicarboxylic acid and 35 mol % of isophthalic acid as a carboxylic acid component and 60 mol % of ethylene glycol as a glycol component. The weight average molecular weight is 13,000.

<<Polyester-Acrylic Blend>>

A resin composition obtained by blending the following polyester resin 3 and the above acrylic A at a mass ratio of 1:1.

Polyester resin 3: a resin obtained by synthesis using: terephthalic acid as a carboxylic acid component; and a glycol component containing ethylene glycol and diethylene glycol at a molar ratio of 90:10.

The weight average molecular weight is 19,000.

Example 1

<Production of Surface Coating Film>

Terephthalic acid and ethylene glycol were polymerized to obtain a polyester P1.

Further, a carboxylic acid component of terephthalic acid and isophthalic acid (terephthalic acid: isophthalic acid=90:10 [molar ratio]) and ethylene glycol were polymerized to obtain a polyester P2. A polyester Q was obtained by polymerization using terephthalic acid as a carboxylic acid component and butylene glycol as a glycol component.

Further, a treatment in which agglomerated silica particles (manufactured by Fuji Silysia Chemical Ltd.) having an average particle diameter of 1.7 μm were contained in the polyester P2 on the order of ppm was performed by a publicly known method to obtain a polyester R.

The polyesters P2, Q, and R prepared above were dried at 160° C. for 4 hours to remove moisture, then supplied to a hopper so that polyester P2/polyester Q/polyester R=50/45/5 in a weight ratio to be chip mixed, and then melt extruded into a sheet shape from an extruder set to 280° C. by using a die.

When melt extrusion was performed into a sheet shape, the polyester P1 was merged from a die by using a feed block, and a layer (the flat layer b2) containing the polyester P1 was laminated on a layer (easily molded layer b1) containing the polyesters P2, Q, and R, and the two layers were extruded so that a thickness ratio of the easily molded layer b1 to the flat layer b2 was 3:7, and immediately cooled by a casting drum at 20° C. to obtain a cast film (base material film B).

In a subsequent longitudinal stretching step, the obtained cast film was stretched to 3.0 times at 90° C. to obtain a uniaxial film. The easily adhesive layer forming application liquid prepared above was applied to a surface of the layer (the easily molded layer b1) containing the polyester P2 in the uniaxial film by a roll coater so that a film thickness of the easily adhesive layer A has a thickness shown in Table 1, then guided to a stenter step, and a coating film was dried to form the easily adhesive layer A.

The obtained uniaxial film was stretched so that transverse stretching was 3.2 times at 105° C., relaxed 1% in the width direction while being treated at 210° C. in a crystallization zone to reduce thermal contraction to produce the surface coating film which is a biaxially stretched film having a thickness of 50 μm, and wound into a roll shape.

Thermal contraction of the surface coating film at 150° C., the storage moduli at each temperature of the easily molded layer b1 and the flat layer b2, the thickness of the easily adhesive layer A, and presence or absence of an epoxy group and an oxazoline group in the easily adhesive layer A are measured by a method to be described below, and the results are described in Table 1.

<<Thermal Contraction of Surface Coating Film at 150° C.>>

Thermal contraction of the surface coating film in Table 1 at 150° C. in the film production direction (MD direction) and the width direction (TD direction) was measured by the following method.

The base material film B was cut into 40 cm×40 cm and used as an evaluation sample. Gauge points at 30 cm intervals were noted in the film production direction (MD direction) and the width direction (TD direction) of the evaluation sample, and then a heat treatment was performed in an oven at 150° C. for 30 minutes. After the heat treatment, the evaluation sample was cooled to room temperature, a length between the gauge points after the heat treatment was subtracted from a length between the gauge points before the heat treatment, and the difference was divided by the dimension before the heat treatment to obtain a thermal contraction rate (%).

<<Thickness of Easily Adhesive Layer A>>

The thickness of the easily adhesive layer A in Table 1 was measured by the following method.

A small piece was sampled from the surface coating film, embedded and cured with an epoxy resin, then an ultrathin section was produced using a microtome, and a cross section thereof was observed with a transmission electron microscope (TEM). The thickness of the easily adhesive layer A was calculated from the obtained image and scale. A measurement of another layer of the surface coating film and collection of an analysis sample from another layer of the surface coating film can also be performed according to the procedure described above.

<<Content of Epoxy Group and Oxazoline Group in Easily Adhesive Layer A>>

The content of the functional groups was confirmed using H-NMR on the ultrathin section obtained by the production method for measuring the thickness of the easily adhesive layer A.

<<Storage Modulus ELb1>>

The storage modulus ELb1 of the easily molded layer b1 at 23° C. and a frequency of 1 Hz was measured using a dynamic viscoelasticity measurement device (product name: DMA8000, manufactured by PerkinElmer) while pulling the easily molded layer b1 in the MD direction with a tension jig.

<<Storage Modulus EHb1>>

In measurement of the storage elastic modulus ELb1, a storage modulus of the easily molded layer b1 was measured in the same manner as the measurement of the storage modulus ELb1, except that a measurement temperature was 150° C.

<<Storage Modulus EHb2>>

In measurement of the storage modulus ELb1, a storage modulus of the flat layer b2 at 150° C. was measured in the same manner as measurement of the storage modulus EHb1, except that the flat layer b2 was used instead of the easily molded layer b1.

<Production of Fiber Reinforced Resin Molded Article>

Five sheets of fiber impregnated resin (carbon fiber reinforced prepreg composed of epoxy resin, Tenax (registered trademark) W-3101/Q-195, manufactured by Teij in Limited) were laminated to produce a laminate of the fiber impregnated resin. The surface coating film obtained above and the laminate of the fiber impregnated resin overlapped so that the easily adhesive layer A of the surface coating film and the laminate are in contact with each other, then integral molding was performed by press molding at a molding temperature of 150° C., and an integrally molded article of the carbon fiber reinforced resin was obtained at curing time of 5 minutes.

The obtained integrally molded article (hereinafter, also simply referred to as "integral molded article") of the carbon fiber reinforced resin was used to perform the following evaluation. The results were shown in Table 1.

<Evaluation of Surface Coating Film>

(1) Adhesion

The surface of the surface coating film of the integrally molded article obtained above was cut to a depth reaching the base material film B to provide a grid shaped scratch of 100 squares. A polyester adhesive tape (product name: No. 31B, manufactured by Nitto Denko Corporation) was attached so as to cover the whole grid shaped scratches, and the adhesive tape was peeled off. The surface of the surface coating film after peeling was observed with an optical microscope (35 times), the number of peelings and coating film cracks was measured, and adhesion to the fiber reinforced resin was evaluated by the following criteria. The results were shown in Table 1.

—Evaluation Criteria—

A: Peelings and coating film cracks are not observed at all, and adhesion is excellent.

B: The number of peelings or coating film cracks is one, and adhesion is slightly excellent.

C: The number of peelings or coating film cracks is 2 to 10, and adhesion is slightly inferior.

D: The number of peelings or coating film cracks is 11 or more, and adhesion is inferior.

(2) Image Clarity

The obtained integrally molded article was visually observed under a fluorescent lamp (manufactured by Panasonic Corporation, 3-wavelength neutral white, FHF24SEN 24 W). When reflection of the fluorescent lamp was visually confirmed, distortion of a fluorescent lamp image projected on the surface of the surface coating film of the integrally molded article was observed to perform evaluation of the image clarity based on the following evaluation criteria. The distortion of the fluorescent lamp image was observed in specular reflection, and an observation angle is an angle from a horizontal plane.

—Evaluation Criteria—

A+: When an observer observes the fluorescent lamp image projected on the surface of the surface coating film of the integrally molded article, no distortion of the fluorescent lamp image is seen regardless of an observation angle, the integrally molded article is glossy, and a good reflected image is obtained.

A−: When an observer observes the fluorescent lamp image projected on the surface of the surface coating film of the integrally molded article at an observation angle of 45 degrees or more, no distortion of the fluorescent lamp image is seen; distortion of the fluorescent lamp image is observed at the observation angle of less than 45 degrees, the integrally molded article is glossy, and a good reflected image is obtained.

B: When an observer observes the fluorescent lamp image projected on the surface of the surface coating film of the integrally molded article at an observation angle of 45 degrees, the fluorescent lamp image is partially distorted, the integrally molded article is glossy, and a relatively good reflected image is obtained.

C: When an observer observes the fluorescent lamp image projected on the surface of the surface coating film of the integrally molded article at an observation angle of 45 degrees, the fluorescent lamp image is entirely distorted, the integrally molded article is glossy, but a reflected image is slightly unclear.

D: When an observer observes the fluorescent lamp image projected on the surface of the surface coating film of the integrally molded article at an observation angle of 45 degrees, the fluorescent lamp image is entirely distorted, glossiness of the integrally molded article is inferior, and a reflected image is unclear.

(3) Glossiness

A 60° gloss value (glossiness) of the surface of the surface coating film of the integrally molded article was measured using a handy gloss meter (product name PG-IIM, manufactured by Nippon Denshoku Industries Co., Ltd.). The larger the measured value, the better the glossiness is.

(4) Total Light Transmittance

Total light transmittance (unit: %) of the surface coating film was measured using a Haze measuring instrument (NDH-2000) manufactured by Nippon Denshoku Industries, Ltd., in accordance with total light transmittance JIS K7361 to read average light transmittance at 300 nm to 800 nm.

Examples 2 to 8 and Comparative Examples 1 to 6

Surface coating films were produced in the same manner as in Example 1 except that composition and thickness of Example 1 were changed to those shown in Table 1 or Table 2, and integrally molded articles of a carbon fiber reinforced resin were obtained by press molding. The obtained integrally molded articles were evaluated separately in the same manner as in Example 1. In all Examples except for Example 6, the total light transmittance of the surface coating film was 80% or more.

TABLE 1

| | | | | | Example 1 | Example 2 | Examine 3 | Example 4 |
|---|---|---|---|---|---|---|---|---|
| Reinforced fiber integrally molded article | Surface coating film | Base material film B | Flat layer b2 | Composition | PET | PET | PET | PET |
| | | | | Storage modulus ELb2 at 23° C. (MPa) | 4,000 | 4,500 | 4,000 | 4,000 |
| | | | | Storage modulus EHb2 at 150° C. (MPa) | 600 | 800 | 600 | 600 |
| | | | Easily molded layer b1 | Composition | IAPET//PBT | IAPET//PBT | IAPET//PBT | IAPET//PBT |
| | | | | Storage modulus ELb1 at 23° C. (MPa) | 3,000 | 3,200 | 3,000 | 3,000 |
| | | | | Storage modulus EHb1 at 150° C. (MPa) | 50 | 50 | 50 | 50 |
| | | | | EHb2/EHb1 | 12 | 16 | 12 | 12 |
| | | | | Pigment: type | — | — | — | — |
| | | | | Content (mass %) | — | — | — | — |
| | | | Thickness of base material film B (μm) | | 50 | 125 | 50 | 50 |
| | | Easily adhesive layer A | Binder resin | Type | acrylic A | acrylic A | acrylic A | acrylic B |
| | | | | Content (mass %) | 65 | 65 | 65 | 65 |
| | | | Specific crosslinking agent | Functional group | epoxy group | epoxy group | epoxy group | epoxy group |
| | | | | Content (mass %) | 20 | 20 | 20 | 20 |
| | | | Filler | Type | — | — | — | — |
| | | | | Content (mass %) | — | — | — | — |
| | | Thickness of easily adhesive layer A (nm) | | | 90 | 90 | 150 | 91 |
| | | Refractive index of easily adhesive layer A | | | 1.50 | 1.50 | 1.50 | 1.50 |
| | | Thickness of surface coating film (μm) | | | 50.090 | 125.090 | 50.150 | 50.091 |
| | | Thermal contraction of surface coating film at 150° C. MD (%) | | | 3.0 | 3.0 | 3.0 | 3.0 |
| | | Thermal contraction of surface coating film at 150° C. TD (%) | | | 6.0 | 5.0 | 6.0 | 6.0 |
| | | Absolute value Δχ of thermal contraction difference (%) | | | 3.0 | 2.0 | 3.0 | 3.0 |
| | Fiber impregnated resin | Matrix resin | | Type | W-3101/Q-195 | W-3101/Q-195 | W-3101/Q-195 | W-3101/Q-195 |
| | | | | Content (mass %) | 40 | 40 | 40 | 40 |
| | | Fiber | | Type | carbon | carbon | carbon | carbon |
| | | | | Basis weight (g/m²) | 197 | 197 | 197 | 197 |
| | | Adhesion | | | A | A | A | A |
| | | Image clarity | | | A− | A− | A− | A− |
| | | Glossiness/60° | | | 108 | 110 | 115 | 112 |

| | | | | | Example 5 | Example 6 | Example 7 |
|---|---|---|---|---|---|---|---|
| Reinforced fiber integrally molded article | Surface coating film | Base material film B | Flat layer b2 | Composition | PET | PET | PEN |
| | | | | Storage modulus ELb2 at 23° C. (MPa) | 4,000 | 4,200 | 4,500 |
| | | | | Storage modulus EHb2 at 150° C. (MPa) | 600 | 600 | 1,500 |
| | | | Easily molded layer b1 | Composition | IAPET//PBT | IAPET//PBT | IAPET//PBT |
| | | | | Storage modulus ELb1 at 23° C. (MPa) | 3,000 | 3,000 | 3,000 |
| | | | | Storage modulus EHb1 at 150° C. (MPa) | 50 | 120 | 50 |
| | | | | EHb2/EHb1 | 12 | 5 | 30 |
| | | | | Pigment: type | — | titanium dioxide | — |
| | | | | Content (mass %) | — | 12 | — |
| | | | Thickness of base material film B (μm) | | 50 | 50 | 230 |

TABLE 1-continued

|  |  |  |  |  |  |  |
|---|---|---|---|---|---|---|
|  | Easily adhesive layer A | Binder resin | Type | polyester | acrylic B | acrylic A |
|  |  |  | Content (mass %) | 60 | 65 | 65 |
|  |  | Specific crosslinking agent | Functional group | epoxy group | epoxy group | epoxy group |
|  |  |  | Content (mass %) | 35 | 20 | 20 |
|  |  | Filler | Type | silica | — | — |
|  |  |  | Content (mass %) | 2 | — | — |
|  | Thickness of easily adhesive layer A (nm) |  |  | 90 | 103 | 90 |
|  | Refractive index of easily adhesive layer A |  |  | 1.57 | 1.50 | 1.50 |
|  | Thickness of surface coating film (μm) |  |  | 50.090 | 50.103 | 230.090 |
|  | Thermal contraction of surface coating film at 150° C. MD (%) |  |  | 3.0 | 3.0 | 0.4 |
|  | Thermal contraction of surface coating film at 150° C. TD (%) |  |  | 6.0 | 5.0 | 0.0 |
|  | Absolute value Δχ of thermal conrtraction difference (%) |  |  | 3.0 | 2.0 | 0.4 |
| Fiber impregnated resin | Matrix resin | Type |  | W-3101/Q-195 | W-3101/Q-195 | W-3101/Q-195 |
|  |  | Content (mass %) |  | 40 | 40 | 40 |
|  | Fiber | Type |  | carbon | carbon | carbon |
|  |  | Basis weight (g/m²) |  | 197 | 197 | 197 |
|  | Adhesion |  |  | B | A | A |
|  | Image clarity |  |  | A− | B | A+ |
|  | Glossiness/60° |  |  | 115 | 108 | 115 |

TABLE 2

|  |  |  |  |  | Example 8 | Comparative Example 1 | Comparative Examine 2 | Comparative Example 3 |
|---|---|---|---|---|---|---|---|---|
| Reinforced fiber integrally molded article | Surface coating film | Base material film B | Flat layer b2 | Composition | PET | PET | PET | PET |
|  |  |  |  | Storage modulus ELb2 at 23° C. (MPa) | 4,000 | 4,000 | 4,000 | 4,000 |
|  |  |  |  | Storage modulus EHb2 at 150° C. (MPa) | 600 | 600 | 600 | 600 |
|  |  |  | Easily molded layer b1 | Composition | IAPET//PBT | IAPET//PBT | IAPET//PBT | PET |
|  |  |  |  | Storage modulus ELb1 at 23° C. (MPa) | 3,000 | 3,000 | 3,000 | 4,000 |
|  |  |  |  | Storage modulus EHb1 at 150° C. (MPa) | 50 | 50 | 50 | 600 |
|  |  |  |  | EHb2/EHb1 | 12 | 12 | 12 | 1 |
|  |  |  |  | Pigment: type | — | — | — | — |
|  |  |  |  | Content (mass %) | — | — | — | — |
|  |  |  | Thickness of base material film B (μm) |  | 50 | 50 | 50 | 75 |
|  |  | Easily adhesive layer A | Binder resin | Type | polyester/acrylic | acrylic A | acrylic A | acrylic B |
|  |  |  |  | Content (mass %) | 70 | 65 | 65 | 65 |
|  |  |  | Specific crosslinking agent | Functional group | oxazoline group | epoxy group | epoxy group | epoxy group |
|  |  |  |  | Content (mass %) | 20 | 20 | 20 | 20 |
|  |  |  | Filler | Type | silica | — | — | — |
|  |  |  |  | Content (mass %) | 4 | — | — | — |
|  |  | Thickness of easily adhesive layer A (nm) |  |  | 90 | 29 | 280 | 89 |
|  |  | Refractive index of easily adhesive layer A |  |  | 1.56 | 1.50 | 1.50 | 1.50 |
|  |  | Thickness of surface coating film (μm) |  |  | 50.090 | 50.029 | 50.280 | 75.089 |
|  |  | Thermal contraction of surface coating film at 150° C. MD (%) |  |  | 3.0 | 3.0 | 3.0 | 3.0 |
|  |  | Thermal contraction of surface coating film at 150° C. TD (%) |  |  | 6.0 | 6.0 | 6.0 | 3.0 |
|  |  | Absolute value Δχ of thermal conrtraction difference (%) |  |  | 3.0 | 3.0 | 3.0 | 0.0 |
| Fiber impregnated resin | Matrix resin | Type |  |  | W-3101/Q-195 | W-3101/Q-195 | W-3101/Q-195 | W-3101/Q-195 |
|  |  | Content (mass %) |  |  | 40 | 40 | 40 | 40 |
|  | Fiber | Type |  |  | carbon | carbon | carbon | carbon |
|  |  | Basis weight (g/m²) |  |  | 197 | 197 | 197 | 197 |
|  | Adhesion |  |  |  | B | A | A | A |
|  | Image clarity |  |  |  | B | C | C | D |
|  | Glossiness/60° |  |  |  | 115 | 101 | 99 | 97 |

TABLE 2-continued

|  |  |  |  |  | Comparative Example 4 | Comparative Example 5 | Comparative Example 6 |
|---|---|---|---|---|---|---|---|
| Reinforced fiber integrally molded article | Surface coating film | Base material film B | Flat layer b2 | Composition | IAPET//PBT | IAPET//PBT | PET |
|  |  |  |  | Storage modulus EHb2 at 23° C. (MPa) | 3,000 | 3,000 | 4,000 |
|  |  |  |  | Storage modulus EHb2 at 150° C. (MPa) | 50 | 50 | 600 |
|  |  |  | Easily molded layer b1 | Composition | PET | PEN | PUE |
|  |  |  |  | Storage modulus ELb1 at 23° C. (MPa) | 4,000 | 4,000 | 95 |
|  |  |  |  | Storage modulus EHb1 at 150° C. (MPa) | 600 | 1.500 | 5 |
|  |  |  |  | EHb2/EHb1 | 0.08 | 0.03 | 120 |
|  |  |  |  | Pigment: type | — | — | — |
|  |  |  |  | Content (mass %) | — | — | — |
|  |  |  |  | Thickness of base material film B (μm) | 50 | 230 | 350 |
|  |  | Easily adhesive layer A | Binder resin | Type | acrylic A | acrylic A | acrylic A |
|  |  |  |  | Content (mass %) | 65 | 65 | 65 |
|  |  |  | Specific crosslinking agent | Functional group | epoxy group | epoxy group | epoxy group |
|  |  |  |  | Content (mass %) | 20 | 20 | 20 |
|  |  |  |  | Type | — | — | — |
|  |  |  | Filler | Content (mass %) | — | — | — |
|  |  |  | Thickness of easily adhesive layer A (nm) |  | 90 | 90 | 90 |
|  |  |  | Refractive index of easily adhesive layer A |  | 1.50 | 1.50 | 1.50 |
|  |  | Thickness of surface coating film (μm) |  |  | 50.090 | 230.090 | 350.089 |
|  |  | Thermal contraction of surface coating film at 150° C. MD (%) |  |  | 3.0 | 0.4 | 4.0 |
|  |  | Thermal contraction of surface coating film at 150° C. TD (%) |  |  | 6.0 | 0.0 | 5.0 |
|  |  | Absolute value Δχ of thermal conrraction difference (%) |  |  | 3.0 | 0.4 | 1.0 |
|  | Fiber impregnated resin | Matrix resin |  | Type | W-3101/ Q-195 | W-3101/ Q-195 | W-3101/ Q-195 |
|  |  |  |  | Content (mass %) | 40 | 40 | 40 |
|  |  | Fiber |  | Type | carbon | carbon | carbon |
|  |  |  |  | Basis weight (g/m$^2$) | 197 | 197 | 197 |
|  |  |  |  | Adhesion | A | A | B |
|  |  |  |  | Image clarity | D | D | C |
|  |  |  |  | Glossiness/60° | 87 | 89 | 98 |

MD in Table 1 and Table 2 means the longitudinal direction, and TD in Table 1 and Table 2 means the width direction. Abbreviations in Table 1 and Table 2 are as follows.

PET: polyester resin, weight average molecular weight: 20,000 (polyester P1)

IAPET//PBT: copolymer of polyethylene isophthalate and polybutylene terephthalate, weight average molecular weight: 75,000 (polyester P2)

PEN: polyethylene-2,6-naphthalate, weight average molecular weight: 10,000 PUE: polyurethane resin, weight average molecular weight: 40,000

Compounds used in production of the surface coating films of Table 1 and Table 2 are shown below.

(Filler Added in Easily Adhesive Layer A)

Silica: manufactured by Nissan Chemical Corporation, trade name: "ST-OL"

(Fiber Impregnated Resin)

W-3101/Q-195: carbon fiber reinforced prepreg including epoxy resin, product name: fabric prepreg "Tenax" (registered trademark) W-3101/Q-195, manufactured by Toho Tenax Co., Ltd.

Fiber basis weight: 197 g/m$^2$, resin content rate: 40 mass %, curing time at 150° C.: 5 minutes.

The specific crosslinking agent contained in the easily adhesive layer forming application liquid used during formation of the easily adhesive layer A is as follows.

(Specific Crosslinking Agent)

Crosslinking agent containing epoxy group as functional group: a crosslinking agent containing a bifunctional epoxy group (trade name "DENACOL EX-313", manufactured by Nagase ChemteX Corporation) and a crosslinking agent containing a tetrafunctional epoxy group (trade name: "TETRAD-X", manufactured by Mitsubishi Gas Chemical Company, Inc.) were mixed at a ratio of 1:3 and used.

Crosslinking agent having oxazoline group as functional group: trade name "Epocros (registered trademark) WS-700", manufactured by Nippon Shokubai Co., Ltd.

From the results described in Table 1 and Table 2, the fiber reinforced resin molded article according to the present invention has excellent image clarity as compared with the fiber reinforced resin molded article of Comparative Examples. The fiber reinforced resin molded article according to the present invention has excellent adhesion.

INDUSTRIAL APPLICABILITY

It can be said that the surface coating film according to the present invention is an epoch making technique capable of finishing painting at the same time as integral molding with the fiber reinforced resin, and is industrially useful not only in sports equipment, automobiles, ships, and aircrafts but also in other applications.

Although the present invention is described in detail with reference to the specific embodiment, it will be apparent to those skilled in the art that various changes and modifications can be made without departing from the spirit and scope of the present invention.

The present application is based on Japanese Patent Application No. 2018-185565 filed on Sep. 28, 2018, the contents of which are incorporated herein by reference.

REFERENCE SIGN LIST

1 Surface coating film
A Easily adhesive layer A
B Base material film B
b1 Easily molded layer b1
b2 Flat layer b2
2 Fiber impregnated resin
3 Surface-coated fiber-reinforced resin molded article

The invention claimed is:

1. A surface coating film for integral molding with a fiber impregnated resin, the film comprising:
a base material film (B); and
an adhesive layer (A) provided on the base material film (B), the base material film (B) including
a molded layer (b1) adjacent to the adhesive layer (A) and
a flat layer (b2), wherein
the adhesive layer (A) has a thickness of 30 nm to 250 nm;
the base material film (B) has a thickness of 50 μm to 500 μm; and
the molded layer (b1) and the flat layer (b2) satisfy each of the following formula 1 and formula 2:

$3 \leq$ ratio ($EHb2/EHb1$) of storage modulus $EHb2$ of the flat layer $b2$ at 150° C. to storage modulus $EHb1$ of the easily molded layer $b1$ at 150° C.    Formula 1

$1000$ MPa$\leq$storage modulus $ELb1$ of the easily molded layer $b1$ at 23° C.    Formula 2

2. The surface coating film according to claim 1, wherein the ($EHb2/EHb1$) in the formula 1 is 50 or less.

3. The surface coating film according to claim 1, wherein the molded layer (b1) further satisfies the following formula 3:

$10$ MPa$\leq$storage modulus $EHb1$ of the easily molded layer $b1$ at 150° C.$\leq 950$ MPa    Formula 3

4. The surface coating film according to claim 1, wherein the base material film (B) is a biaxially oriented film.

5. The surface coating film according to claim 1, wherein the molded layer (b1) and the flat layer (b2) contain a thermoplastic resin.

6. The surface coating film according to claim 1, wherein the adhesive layer (A) contains:
a binder resin;
a crosslinking agent having at least one functional group selected from the group consisting of an epoxy group, an oxazoline group, a silanol group, and an isocyanate group; and
a cured product of the binder resin and the crosslinking agent.

7. The surface coating film according to claim 1, wherein total light transmittance of visible light is 80% or more.

8. A surface-coated fiber-reinforced resin molded article, comprising:
the surface coating film according to claim 1; and
a fiber impregnated resin integrally molded with the surface coating film.

9. The surface-coated fiber-reinforced resin molded article according to claim 8,
wherein the fiber impregnated resin contains carbon fibers.

10. A method for producing a surface-coated fiber-reinforced resin molded article, comprising a process of:
connecting the adhesive layer (A) of the surface coating film according to claim 1 and a fiber impregnated resin; and
integrally molding the surface coating film with the fiber impregnated resin.

11. The method for producing a surface-coated fiber-reinforced resin molded article according to claim 10,
wherein the process contains integrally molding the fiber impregnated resin at 150° C. for 10 minutes or less.

* * * * *